(12) United States Patent
Dale et al.

(10) Patent No.: US 6,574,688 B1
(45) Date of Patent: Jun. 3, 2003

(54) PORT MANAGER CONTROLLER FOR CONNECTING VARIOUS FUNCTION MODULES

(75) Inventors: Michele Z. Dale, Quakertown, PA (US); Farrukh A. Latif, Lansdale, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/416,625

(22) Filed: Oct. 12, 1999

Related U.S. Application Data
(60) Provisional application No. 60/114,770, filed on Jan. 5, 1999.

(51) Int. Cl.⁷ .............................................. G06F 13/14
(52) U.S. Cl. ........................ 710/52; 710/113; 711/151; 358/1.13
(58) Field of Search .............................. 710/5, 52, 113; 711/151; 358/1.13

(56) References Cited

U.S. PATENT DOCUMENTS

| | | | | |
|---|---|---|---|---|
| 4,400,771 A | * | 8/1983 | Suzuki et al. ................ | 364/200 |
| 5,416,909 A | * | 5/1995 | Long et al. .................. | 395/275 |
| 5,640,495 A | * | 6/1997 | Colbert et al. .............. | 358/1.13 |
| 5,781,927 A | * | 7/1998 | Wu et al. ..................... | 711/151 |
| 5,850,530 A | * | 12/1998 | Chen et al. .................. | 710/113 |
| 6,122,680 A | * | 9/2000 | Holm et al. .................. | 710/52 |
| 6,157,963 A | * | 12/2000 | Courtright et al. ............. | 710/5 |
| 6,286,083 B1 | * | 9/2001 | Chin et al. ................... | 711/151 |

* cited by examiner

Primary Examiner—Jeffrey Gaffin
Assistant Examiner—Abdelmoniem Elamin
(74) Attorney, Agent, or Firm—Steve Mendelsohn; Yuri Gruzdkov

(57) ABSTRACT

An improved method and apparatus for connecting various function modules located within a computer or communications system are proposed. In accordance with the principles of the present invention, a port manager controller (PMC) has a direct interface to each of the function modules and to a host component such as a system memory or a CPU. The PMC replaces both the local bus and the arbitrator of prior art systems. All the requests by function modules to access the host component are first processed by the PMC. The PMC schedules the incoming requests in accordance with predefined parameters, such as priority, efficiency, and/or timing. The PMC is capable of handling more than one request at a time. The PMC is also capable of dynamically adapting to load conditions and rearranging the incoming requests to efficiently utilize the available bandwidth. Thus, the PMC reduces latency and improves the performance of the computer or communications system. The PMC also eliminates the need for changes in bus architecture when new function modules are added or old function modules are removed and permits the reuse of old function modules. The PMC also reduces the need for internal buffers and thereby reduces manufacturing costs.

16 Claims, 3 Drawing Sheets

PORT MANAGER CONTROLLER FOR CONNECTING VARIOUS FUNCTION MODULES

This application claims the full benefit and priority of U.S. Prov. Application Ser. No. 60/114,770 filed on Jan. 5, 1999.

BACKGROUND OF THE INVENTION

1. Field of the Invention

The present invention relates to computer and communications systems. In particular, the invention relates to technology for connecting external devices with a computer or communications system.

2. Description of the Related Art

Many computer or communications systems that perform peripheral input/output functions or other network data exchange functions rely on one or more function modules to interconnect the system with one or more external devices. A function module is an input/output block facilitating data communication between a device external to a computer or communications system and internal components located within that system. Examples of function modules include processor cores and interface cores. Examples of internal components include host components such as system memory and central processing units (CPUs). Examples of external devices include hard disk drives, printers, external modems, floppy disk drives, and CD-ROMs. Traditionally, the function modules and host components are located on a single circuit board or on a single integrated chip.

Function modules need to be interconnected to the internal components. This interconnection facilitates data information sharing among the various function modules. For example, a function module may receive data from an external device and transmit the data to the system memory (also known as "writing" to the system memory). Alternatively, the function module may receive data from the system memory (also known as "reading" from the system FIG. 1 is a block diagram illustrating a prior art system 100 wherein five function modules 101–109 are interconnected via a local bus 120. In an exemplary case, function module 101 is an IEEE 1394-95 controller, function module 103 is a peripheral component interconnect (PCI) bridge, function module 105 is an ethernet controller (in accordance with IEEE 802.3 Standard), function module 107 is a universal serial bus (USB), and function module 109 is a high-speed integrated device electronics (IDE) controller. In addition, each function module is directly connected to an external device 151–159 (external to the integrated circuit where the function modules and the host components are located).

Local bus 120 is connected to a central arbitrator 122, which in turn is directly connected to a host component 130 (e.g., system memory or CPU). Arbitrator 122 controls the traffic on local bus 120. The traffic on local bus 120 represents data exchanged between host component 130 and function modules 101–109. Whenever a function module 101–109 needs to write to and/or read from host component 130, the function module needs an access to local bus 120. In order to gain access to local bus 120, the function module sends an access request to arbitrator 122. Depending on the current traffic on local bus 120, arbitrator 122 either grants or denies the request. If access is granted, the function module performs the data exchange for a pre-determined period of time or for a pre-defined number of bytes. After the data exchange is complete, the access to local bus 120 is relinquished. At this time, another function module (or the same function module) may request access to local bus 120, and the cycle is repeated all over again.

Each function module is directly connected to local bus 120 but only one function module can transmit or receive data via local bus 120 at a time. Arbitrator 122 can handle only one access request at a time. Arbitrator 122 relies on bus arbitration wherein all function modules are polled for outstanding requests and then an access is granted to only one function module based on a fixed priority basis. If local bus 120 is already in use by a first function module (i.e., conducting a data exchange) when a second function module requests access to the bus, arbitrator 122 places the request from the second function module on hold. Only after the first function module completes its access to local bus 120 (i.e., completes its data exchange) will arbitrator 122 grant the request from the second function module. As such, the second function module has to wait until the first function module has completed its data exchange. This wait period (i.e., latency) adds to the actual time taken to complete a data exchange by the second function module and adversely affects the performance of the computer or communications system.

Prior art system 100 also requires that function modules 101–109 have internal buffers (i.e., memory space) for temporarily storing data. If a function module receives data from an external device but cannot have immediate access to local bus 120, the function module must hold the data in its internal buffer until access to the bus is granted. Larger internal buffers are required to accommodate longer wait times. Internal buffers are expensive and the dollar cost increases with increased number/size of buffers.

Generally, in prior art system 100, local bus 120 is balanced to operate at maximum operating frequency. When new function modules are added to local bus 120 or any old function modules are removed from local bus 120, the prior art requires rebalancing to create maximum operating frequency. This rebalancing adds to the dollar cost. Alternatively, if the design or architecture of the local bus is upgraded or enhanced, the design of function modules accessing local bus 120 may need to be enhanced or replaced. This also adds to the dollar cost.

In the prior art system 100, each function module has a predefined throughput (i.e., maximum bandwidth). Thus, if a particular function module requires additional bandwidth on local bus 120 to complete a data exchange, the function module may not exceed its allocated maximum bandwidth even though additional bandwidth is available (not used by other functions). To complete the data exchange, the function module must request and wait for another access to local bus 120. This results in an inefficient use of the available bandwidth on local bus 120 and slows down the performance.

SUMMARY OF THE INVENTION

An improved method and apparatus for connecting various function modules located within a computer or communications system are proposed. In accordance with the principles of the present invention, a port manager controller (PMC) having a direct interface to each of the function modules and to a host component such as a system memory or a CPU is provided. The PMC replaces both the local bus and the arbitrator of prior art systems. All the requests by function modules to access the host component are first processed by the PMC. The PMC schedules the incoming requests in accordance with predefined parameters, such as priority, efficiency, and/or timing.

The PMC is capable of handling more than one request at a time. The PMC is also capable of dynamically adapting to load conditions and rearranging the incoming requests to efficiently utilize the available bandwidth. Thus, the PMC reduces latency and improves the performance of the computer or communications system. The PMC also eliminates the need for changes in bus architecture when new function modules are added or old function modules are removed and permits the reuse of old function modules. The PMC also reduces the need for internal buffers and thereby reduces manufacturing costs.

In one embodiment, the present invention is a port manager controller for controlling access to a host component by a plurality of function modules, wherein the PMC comprises (a) a host component port configured to be connected to the host component; and (b) at least two function module ports, each configured to be connected via a point-to-point connection to one of the function modules. The PMC is configured to (1) receive a first access request from a first function module at a first function module port of the PMC, and (2) schedule a first access session for data exchange between the first function module and the host component via the host component port and the first function module port.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION OF A PREFERRED EMBODIMENT

Figure 2:
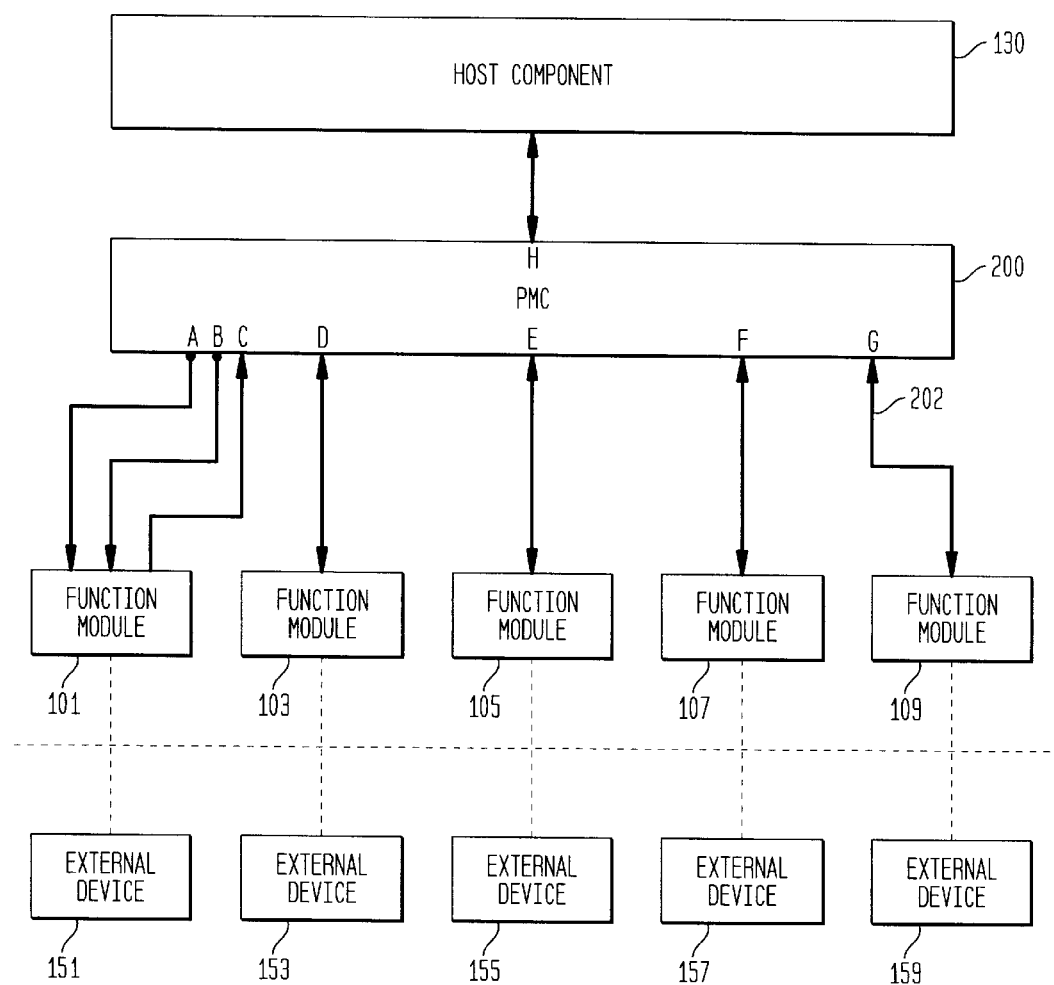
FIG. 2 is a block diagram illustrating a computer or communication system in accordance with one embodiment of the present invention.

FIG. 2 is a block diagram illustrating a computer or communication system in accordance with a preferred embodiment of the present invention. FIG. 2 illustrates an exemplary case wherein a port manager controller (PMC) 200 is directly connected to function modules 101–109 via point-to-point connections 202. PMC 200 is also directly connected to a host component 130 via a host port, termed Port H.

In the exemplary embodiment of FIG. 2, PMC 200 comprises seven different function modules ports labeled as Ports A–G. Ports A–C are connected to function module 101 wherein each port is equipped to handle unidirectional data streams to or from function module 101. Ports A and B are used to perform operations in which data is received from host component 130 and transmitted to function module 101 (reading from the host component 130). Port C is used to transmit data from function module 101 to host component 130 (writing to the host component 130). Ports D–G of PMC 200 are connected to function modules 103–109, respectively. Each of Ports D–G is capable of handling bidirectional data streams (i.e., reading and writing).

FIG. 2 illustrates an exemplary case wherein function module 101 is coupled to three ports and each of the other function modules 103–109 is coupled to only one port. This is only an illustration to show that each of the function modules may be coupled to one or more ports. Moreover, in alternative embodiments, PMCs of the present invention may have fewer or more than seven ports.

In the present invention, each port has an option of handling data transmission of different types. In an exemplary case, Port A may handle the type of data where data exchange must occur with minimal errors, e.g., writing to the memory. Port B may handle data transmission where timely delivery of data is critical, e.g., audio or video data transmission. Thus, Port A and Port B have different bandwidth and delivery requirements that should be fulfilled by the PMC. PMC 200 of the present invention accomplishes this purpose.

Furthermore, since each function module is connected to PMC 200 via a dedicated point-to-point connection 202, multiple function modules may send access requests in parallel to PMC 200. PMC 200 is capable of receiving and handling access requests (i.e., scheduling future access) even when a data exchange is currently in progress, thereby efficiently utilizing available bandwidth. In an exemplary case, PMC 200 schedules accesses in a continuous order such that, at each clock cycle, data is transferred (sent or received) from the host component 130. In the prior art, a subsequent access request can only be sent upon completion of the data exchange for the previous access and clock cycles were wasted in the delay between the completion of one data exchange and the scheduling of the next access.

Figure 1:
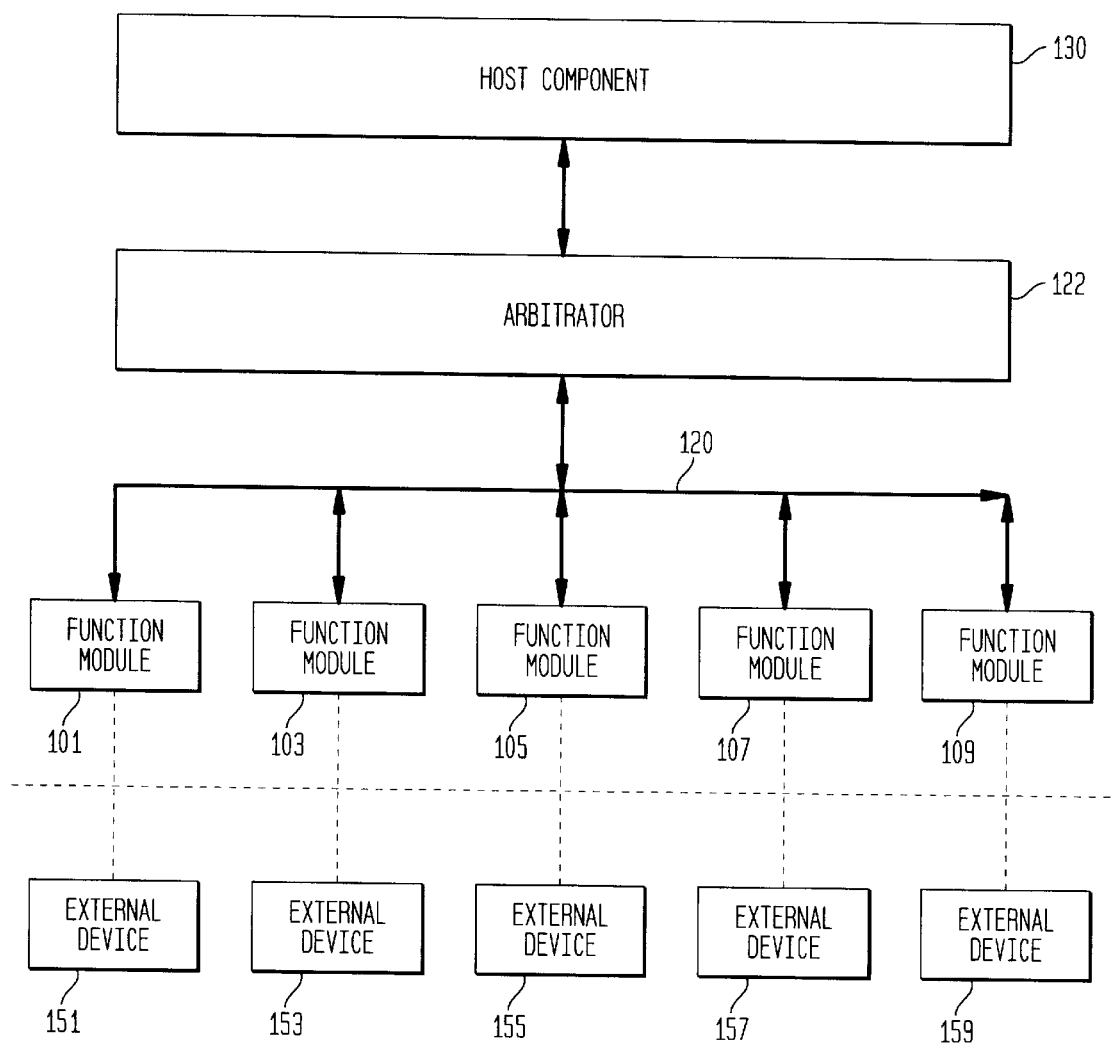
FIG. 1 is a block diagram illustrating various components of a prior art computer or communication system.

Thus, compared to the prior art serial local bus 120 of FIG. 1, the latency in handling access requests is reduced by the present invention. As the latency in access is reduced, the need for internal buffers within function modules 101–109 is also reduced, which in return reduces the dollar cost associated with manufacturing.

In the configuration of FIG. 2, each function module 101–109 identifies a particular operation to be performed using a system memory address or some other identification means. Such identification means are used every time a function module wants to perform an operation through PMC 200 (i.e., needs to transmit or receive data to or from the host component 130). When a function module needs to transmit or receive data from host component 130, the function module presents its identification information along with the data to PMC 200 and requests an access. PMC 200 evaluates the incoming access request and compares it to other pending access requests from other function modules. PMC 200 may handle a plurality of incoming access requests at one time and may schedule them in an order based on priority, efficiency, timing, and/or other predefined parameters. PMC 200 may be programmed with a list of predefined parameters, which may be updated or modified later.

Figure 3:
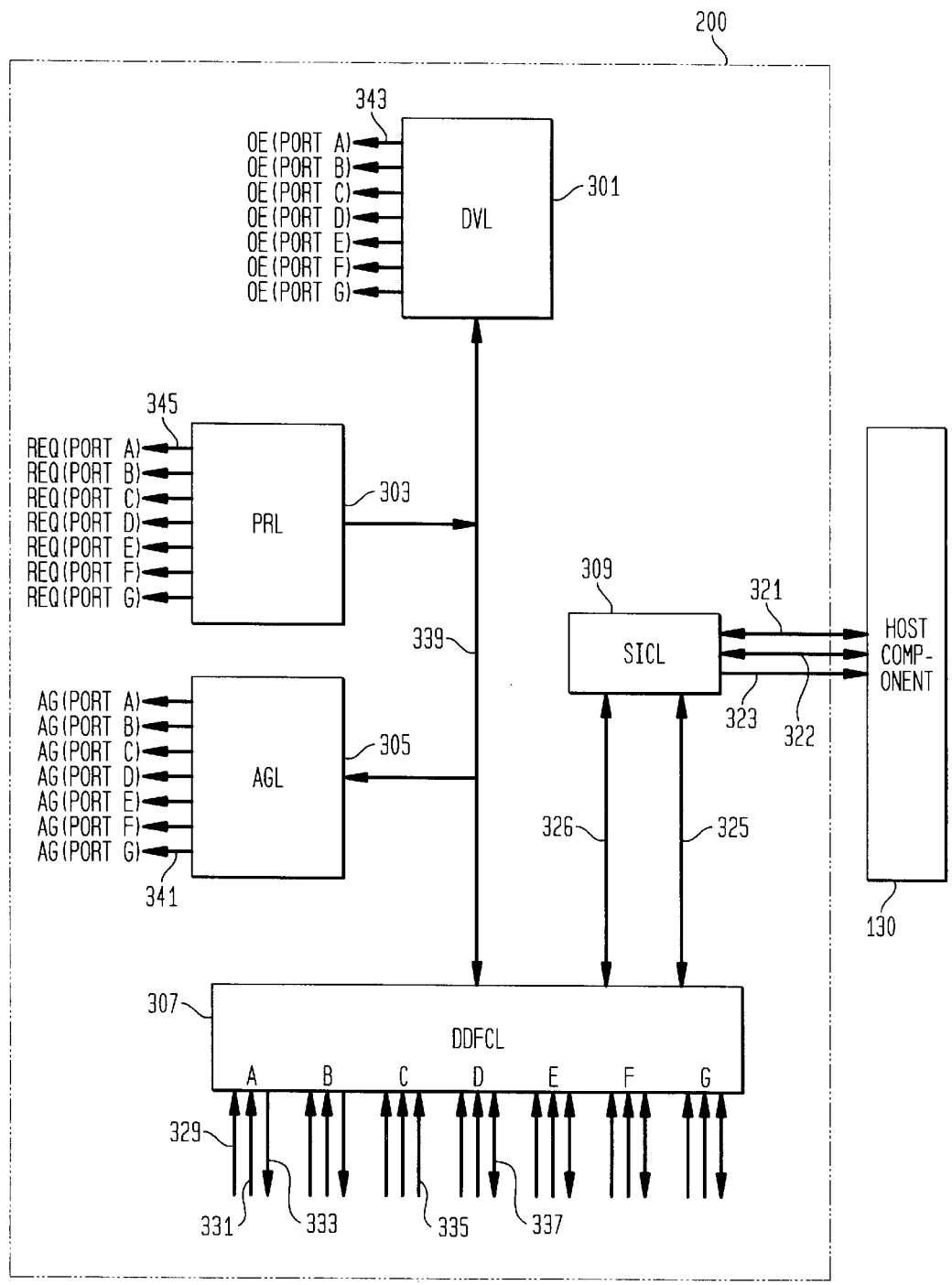
FIG. 3 is a block diagram illustrating various components located within the port manager controller of FIG. 2.

FIG. 3 is a block diagram illustrating various components located within PMC 200 of FIG. 2, according to one embodiment of the present invention. PMC 200 comprises Data Valid Logic (DVL) 301, Priority Resolution Logic (PRL) 303, Access Granted Logic (AGL) 305, Direction and Data Format Control Logic, (DDFCL) 307, and System Interface Core Logic (SICL) 309.

SICL 309 provides an interface between host component 130 and PMC 200. SICL 309 is directly connected to host component 130 by a bidirectional control link 321, a bidirectional data link 322, and a unidirectional address link 323. Bidirectional control link 321 may comprise one or more individual control links. If host component 130 is a system memory, these control links may consist of chip select, write enable, read/write operation indicator, and output enable. Bidirectional data link 322 is used to exchange data during a "read" or a "write" operation. Unidirectional address link 323 is used to identify the host component address or other identification means for a particular function module currently communicating with host component 130.

In addition, SICL 309 is directly connected to DDFCL 307 by a bidirectional data link 325 and a bidirectional control data link 326. DDFCL 307 comprises seven different ports labeled as Ports A–G which in FIG. 2 are shown configured to function modules 101–109. Each of Ports A–G further comprises two unidirectional input data links: an address link 329 and a read/write (R/W) control link 331. In addition, each port has a third link which may be a unidirectional output data link 333, a unidirectional input data link 335, or a bidirectional data link 337. Address link 329 is coupled to receive data input, e.g., s stem memory addresses or other identification means from the corresponding function module. Control link 331 is coupled to receive the control hand-shake from the corresponding function module. In the exemplary configuration of FIG. 2, Port A and Port B are configured as unidirectional data output links 333. Port C is configured as a unidirectional data input link 335, and Ports D–G are configured as bidirectional data links 337.

DDFCL 307 is further connected to DVL 301, PRL 303, and AGL 305 via an internal connection 339. The function modules have data links and address links only to DDFCL 307, but control links also exist between the function modules and DVL 301, PRL 303, and AGL 305.

DVL 301 is coupled to function modules 101–109 via unidirectional output control links 343. DVL 301 comprises seven ports (Ports A–G), wherein each port corresponds to one of function modules 101–109. Each control link 343 is an unidirectional output control link capable of sending a data valid (DV) signal to the corresponding function module 101–109. An DV signal indicates whether data-exchange is enabled in DDFCL 307. For ports having a unidirectional output data link 333, the DV signal is asserted "high" to indicate that the function module is receiving data for a read operation. For ports having a unidirectional input data link 335, the DV signal is asserted "low" indicating that the function module is not receiving any data for a read operation. For ports having a bidirectional data link 337, the DV signal is low during a write operation and high during a read operation.

PRL 303 is coupled to function modules 101–109 via unidirectional input control links 345. PRL 303 comprises seven ports (Ports A–G) wherein each port corresponds to one of function modules 101–109. PRL 303 is capable of receiving access request (REQ) signals from each of function modules 101–109 on a different unidirectional input control link 345.

AGL 305 is coupled to function modules 101–109 via unidirectional output control links 341. AGL 305 comprises seven ports (Ports A–G), wherein each port corresponds to one of function modules 101–109. AGL 305 is capable of sending access granted (AG) signals to function modules 101–109 via unidirectional output control links 341.

A particular function module initiates a communication to PMC 200 by asserting the corresponding REQ signal to PRL 303 via the corresponding input control link 345 and a R/W control signal to DDFCL 307 via the corresponding R/W control link 331. The REQ signal indicates that an access to the host component 130 is requested and the R/W control signal indicates whether it is a read request or a write request. For example, if function module 103 wants to communicate to host component 130, function module 103 initiates communication with PMC 200 by sending a REQ signal via input control link 345 to corresponding Port D of PRL 303, and a control signal via R/W control link 331 to corresponding Port D of DDFCL 307. PRL 303 analyzes the REQ signal and determines whether access to function module 101 should be granted. If PRL 303 agrees to grant an access, a control signal is sent from PRL 303 to AGL 305 and to DVL 301 via internal connection 339. AGL 305 then sends an access granted (AG) signal to function module 103 via output control link 341 of Port D.

If function module 103 is intending to perform a write operation to host component 130, then, after the AG signal is sent on control link 341, the corresponding address link 329 and data link 337 are clocked in DDFCL 307. Only then is the data written from function module 103 to host component 130 via DDFCL 307 and SICL 309. The DV signal remains in the low state for this operation.

Alternatively, if function module 103 is intending to perform a read from host component 130, when the AG signal is asserted, the corresponding clocked address is also forwarded from function module 103 to host component 130. When the data is read from host component 130, the DV signal is asserted from DVL 301 to function module 103 to indicate that read data is now available.

In the exemplary case, if function module 103 has more than one word of data which needs to be transferred to host component 130, the REQ signal will be continuously asserted by function module 103 to PRL 303. In return, PRL 303 will continuously assert control signals to AGL 305 via internal connection 339 wherein the durations of the REQ signals and the control signals are equal to the number of clock signals and with each clock signal one word of data is transferred.

To ease implementation for host component 130, a burst signal may be used as the input signal from function module 103 to DDFCL 301 to indicate a predetermined number of words that may be transferred while the burst signal is being asserted.

PMC 200 and its associated logic circuitry are flexible in operation. If host component 130 is a system memory, as little as one word of data may be transferred to or from a function module to host component 130 before another function module may be serviced. If host component 130 is a CPU, the data exchange is typically represented in data bursts or data streams. In this case, the number of data words transferred is equal to the burst, packet, or stream size. PMC 200 has the ability to accept requests from a plurality of function modules with data lengths varying from one word to multiple words. Thus, PMC 200 may deliver a high performance with minimal buffering requirements in the function modules.

PMC 200 also implements dynamic load balancing between function modules 101–109. Within PMC 200, PRL 303 analyzes each incoming request to ensure that a function module with a higher priority will receive more grants of access than a function module with a low priority. To accomplish this, two types of priority schemes may be used. In the first scheme, function modules have capabilities and decision making abilities on when to assert priority requests. In this scheme, each function module is provided with the capabilities of asserting two types of requests—normal and priority. Generally, only normal requests are asserted, but if the function module must be granted access to host component 130 immediately (e.g., when the function module will experience a data loss condition), then a priority request is asserted.

In the second priority scheme, PMC 200 is provided with priority resolution logic to evaluate and assert priority requests. To accomplish this, each port of PRL 303 is provided with a priority register that contains the weight of each port. The weight of a port is computed by counting the number of requests granted in a unit time. The port with the highest number of requests gets the highest weight and the function module connected to this port is considered a high priority function module. The port with the least number of requests gets the lowest weight and the function module connected to this port is considered a low priority function module. The sum of all weights for all ports is equal to or less than the bandwidth threshold of host component 130. The bandwidth threshold represents the maximum number of requests that may be granted per unit time. If the total number of incoming requests is less than the available bandwidth threshold, the weight to each port is redistributed to ensure that a particular port is not starved (i.e., denied opportunity) to gain access to host component 130. The weight or priority of each port is constantly monitored and is periodically adjusted by evaluating the rate of requests per port. This adjustment dynamically accommodates for loading conditions and results in an increased efficiency of bandwidth usage.

PMC 200 also permits the reuse of function modules without any modifications. If the function modules used in one computer or communications system need to be deployed in another system that utilizes new semiconductor technology, the point-to-point connections of old system may be migrated without any modifications. Unlike prior art bus architecture, the point-to-point connections of the present invention are not affected by new technology and rebalancing is not required to achieve the maximum available operating frequency. Thus, the function modules may be migrated to the new technology with a minimal cost.

PMC 200 may also handle changes in the function modules without any changes in the architecture or bus design. If any function modules are removed or added, their corresponding point-to-point connections to PMC 200 are simply removed or added, respectively. This does not affect the point-to-point connections of other function modules and, their operational characteristics.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller, or general purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A port manager controller (PMC) for controlling access to a host component by a plurality of function modules, wherein the PMC comprises:

(a) a host component port configured to be connected to the host component; and (b) at least two function module ports, each configured to be connected via a point-to-point connection to one of the function modules, wherein:

the PMC is configured to (1) receive a first access request from a first function module at a first function module port of the PMC, (2) schedule a first access session for data exchange between the fast function module and the host component via the host component port and the first function module port, and (3) transfer data directly between the host component port and the first function module port.

2. The invention of claim 1, wherein the PMC is configured to accept a second access request from a second function module, different from the first function module, during the first access session.

3. The invention of claim 2, wherein the PMC is configured to schedule a second access session for data exchange between the second function module and the host component in response to the second access request, without requiring the second function module to send any other access request.

4. The invention of claim 1, wherein the PMC is configured to schedule the first access session based on a priority level for the first function module relative to other function modules.

5. The invention of claim 4, wherein the PMC is configured to control at least one of the start time and duration of the first access session based on the priority level of the first function module.

6. The invention of claim 1, wherein at least two function module ports are configured to be connected to a single function module.

7. The invention of claim 1, wherein each function module port can be individually programmed to operate as either a bidirectional port or a unidirectional port.

8. The invention of claim 1, wherein the point-to-point connection is a unidirectional connection.

9. The invention of claim 1, wherein the point-to-point connection is a bidirectional connection.

10. The invention of claim 1, wherein the PMC comprises:

(a) system interface core logic (SICL) configured to be connected to the host component;

(b) direction and data format control logic (DDFCL) connected to the SICL and configured to be connected to the function modules via a plurality of DDFCL ports;

(c) access granted logic (AGL) connected to the DDFCL and configured to be connected to the function modules via a plurality of AGL ports;

(d) priority resolution logic (PRL) connected to the DDFCL and configured to be connected to the function modules via a plurality of PRL ports; and (e) data valid logic (DVL) connected to the PRL and configured to be connected to the function modules via a plurality of DVL ports, wherein:

the PRL and the DDFCL receive one or more control signals from a function module via corresponding PRL and DDFCL ports to request access to the host component;

the PRL determines whether to grant access to the function module;

if the PRL determines that access is to be granted, the AGL sends an access granted signal to the function module via the corresponding AGL port; and during access by the function module, data is exchanged between the function module and the host component via the SICL and the DDFCL through the corresponding DDFCL port and the DVL sends a data valid signal to the function module via the corresponding DVL port.

11. The invention of claim 10, wherein the PRL, the AGL, the DVL, and the DDFCL communicate via an internal bus.

12. The invention of claim 10, wherein the PRL comprises a register, the register storing priority information related to each of the function modules.

13. The invention of claim 12, wherein the PRL is capable of monitoring the number of the access requests from each of the function modules and updating the priority information in the register based on the monitoring information.

14. The invention of claim 12, wherein the PRL is capable of evaluating the priority information in the register before generating the control signal to the AGL.

15. The invention of claim 10, wherein the PRL is capable of handling a normal access request or a priority access request from each of the function modules.

16. The invention of claim 10, wherein each port of the DDFCL is selectably and independently configurable as a unidirectional input port, a unidirectional output port, or a bidirectional port.

* * * * *